United States Patent [19]
Ratchford

[11] Patent Number: 5,439,215
[45] Date of Patent: Aug. 8, 1995

[54] COMPOSITE, PULTRUDED FIBERGLASS RESINOUS HOCKEY STICK, METHOD AND DEVICE FOR MANUFACTURE THEREOF

[75] Inventor: David Ratchford, Marshall, Ark.

[73] Assignee: Power Stick Manufacturing, Inc., Vancouver, Canada

[21] Appl. No.: 186,168

[22] Filed: Jan. 25, 1994

[51] Int. Cl.$^6$ ............................................. A63B 59/12
[52] U.S. Cl. ................................. 273/67 A; 273/67 R
[58] Field of Search ............... 273/67 R, 67 A, 73 F, 273/DIG. 23; 156/166, 169

[56] References Cited

U.S. PATENT DOCUMENTS

| | | | |
|---|---|---|---|
| 4,084,818 | 4/1978 | Goupil et al. | 273/67 A |
| 4,848,745 | 7/1979 | Bohannan et al. | 273/67 R X |
| 5,050,878 | 9/1991 | Deleris | 273/67 R X |
| 5,217,221 | 6/1993 | Baum | 273/67 A |
| 5,303,916 | 4/1994 | Rodgers | 273/67 A |

*Primary Examiner*—Raleigh W. Chin
*Attorney, Agent, or Firm*—Stephen D. Carver; Trent C. Keisling

[57] ABSTRACT

An automated machine and process for the production of pultruded hockey sticks and similar linear products. The machine comprises a rigid elongated frame and a creel bank supplying rovings from individual spools. An elongated, rigid, hollow mandrel extends substantially along the entire length of the machine supported by the frame. A veil guide directs and wraps a veil around the mandrel at the front of the machine. The machine comprises serial segments, each having a pattern card, a gathering bracket and a spiral winding station. Each segment directs rovings onto the mandrel in a longitudinal layer circumscribed by a radial layer comprising separate spaced apart, continuous rovings forming concentric helixes. The winding stations are synchronized and counter-rotate. A third pattern card converges a third longitudinal layer of rovings toward the mandrel. A resin injection die penetrated by the manifold gathers the rovings from the third card and saturates the uncompleted product with resin. Within the injection die, the mandrel has small diameter passages extending from a central bore to grooves on the surface for conveying resin from the bore to the rovings. A second veil guide directs an outer veil onto the resin impregnated rovings. A heater penetrated by said manifold heats the resultant resin impregnated product. A curing die helps to maintain the outer shape imparted by the injection die and the heater while the product cures. Modified industrial pullers are used to pull the rovings about the mandrel at a predetermined linear speed to form the product.

6 Claims, 9 Drawing Sheets

COMPOSITE, PULTRUDED FIBERGLASS RESINOUS HOCKEY STICK, METHOD AND DEVICE FOR MANUFACTURE THEREOF

BACKGROUND OF THE INVENTION

I. Field of the Invention

The present invention relates generally to pultrusion processes, including processes for manufacturing composite hockey stick shafts. More particularly the present invention relates to methods and apparatus for manufacturing synthetic fiber pultruded products. Known prior art pertinent to the present invention can be found in U.S. Patent Class 273, subclasses 67 and others, Class 156, subclass 178 and U.S. Patent Class 264, subclass 171.

II. Prior Art

Historically, hockey sticks have been manufactured from wood. The handles and blades are glued together in a variety of configurations. The joint between the handle and the blade may be a tongue and grove joint or some type of socket joint. Generally these joints are reinforced to prevent breakage of a hockey stick at this point. Numerous other materials have been used to manufacture the handles and blades of hockey sticks. Laminated wood has been proven to be superior to solid wood. A laminated hockey stick is disclosed in U.S. Pat. No. 4,353,549 issued to Goupil on Oct. 12, 1982. In order to avoid breakage of handles, metal handles have been used on some hockey sticks. Easton, U.S. Pat. No. 3,934,875, discloses an aluminum handled hockey stick with a plastic blade.

Various methods have been proposed to prevent blade breakage and to improve the "action" of the blade. Among these are U.S. Pat. No. 4,084,818 also issued to Goupil, which discloses a resin wrapping with a wear resistant heel. Franck U.S. Pat. No. 4,488,721 discloses a polycarbon wear surface for the base of a blade. Tiitola, U.S. Pat. No. 4,059,269, discloses a layered plastic structure for a hockey stick blade. Harwell, U.S. Pat. No. 4,148,482, discloses a reinforcing net sock to be disposed over a blade during manufacture for reinforcement.

Wooden hockey sticks are expensive to manufacture due to the high cost of the "fine" wood which is necessary to give the hockey stick the proper "action" or "feel." Therefore, fiberglass and plastics have become popular substitutes. Additionally, when a wooded hockey stick breaks, it tends to splinter creating a sharp instrument which can be hazardous, particularly for an individual moving at a fairly high rate of speed on ice skates. Raw plastic and fiberglass materials have competitive cost advantages over wood.

Plastic hockey sticks have evolved over the years. Tiitola, U.S. Pat. No. 3,982,760, discloses a hockey stick made of layered plastic. Goverde, U.S. Pat. No. 4,013,288, discloses a foamed, nylon hockey stick. Adachi, U.S. Pat. No. 4,591,155, discloses a plastic hockey stick which is reinforced by fiberglass. Fiberglass strands are wrapped around the stick and a second layer of strands is laid lengthwise. Finally, cloth is used to "shroud" the stick.

Due to its versatility, fiberglass remains a popular material for hockey sticks. Deleris, U.S. Pat. No. 5,050,878, discloses a foam core fiberglass or carbon fiber hockey stick. Two wrappings of a fiberglass or carbon fiber material are used to reinforce the stick. McKinnon, U.S. Pat. No. 4,358,113, discloses a fiberglass hockey stick having a handle with a double box cross section intended to mate with a matching blade and to be secured with resin.

Combinations of wood, fiberglass and plastic are present in the art. Salminen, U.S. Pat. No. 4,369,970, discloses a laminated hockey stick constructed from wood and fiberglass in alternating layers. Diederich, U.S. Pat. No. 4,134,587, discloses a fiberglass hockey stick having a wooden core. Redekop, U.S. Pat. No. 4,968,032, discloses a hockey stick with a wooden core and fiberglass and wood sandwiching layers on the exterior. Drolet, U.S. Pat. No. 4,684,130, discloses a wooden core hockey stick with a foam disposed between the wooden core and an exterior fiberglass sheeting. U.S. Pat. No. 5,217,221 issued to Baum, discloses a foam core hockey stick which is wrapped in a fiberglass and a wooden veneer disposed on the outer face of the surface of the hockey stick. Hasegawa, U.S. Pat. No. 5,160,135 discloses a wooden blade with fiber reinforced plastic faces.

Other synthetic materials have been proposed for various types of sporting equipment. For example, Bohannan, U.S. Pat. No. 4,848,745 discloses a thermoplastic resin baseball bat reinforced with helical! y wound fibers sandwiched between longitudinal fibers. Akatsuka, U.S. Pat. No. 5,156,396 discloses a carbon fiber golf club shaft. The angle of orientation of the carbon fibers varies from layer to layer.

Several methods for manufacturing hockey sticks have been proposed. Adachi, U.S. Pat. No. 4,600,192, discloses a hockey stick handle constructed of joined "U" shaped sections of fiber reinforced plastic and the use of a mandrel to shape resin and fiber mat into a hollow handle. Carter, U.S. Pat. No. 4,681,722, discloses a method for making a lineal structural member which has a fiber core wrapped by fiberglass. Sweet, U.S. Pat. No. 4,086,115, discloses a method for making a "pultruded" hockey stick comprising pulling resin impregnated fibers through a heated dye and layering it with fiberglass strips.

A review of the prior art reveals that it is desirous to provide a hockey stick which has the "feel" of a wooden hockey stick. In other words, it is desirous to provide a hockey stick which does not have the limitations or expense associated with a wooden hockey stick, but that will provide an equal or better "flex and feel."

As evidenced by the above cited prior art, numerous attempts have been made to construct various fiberglass, plastic and laminated wood sticks that will have desirable characteristics. However, it is difficult to precisely control the resultant feel of laminated wood hockey sticks. Known plastic hockey sticks fail to provide the necessary feel, and they are substantially weaker than composite sticks. Fiberglass sticks tend to be a poor imitator of wood. Also, they tend to fracture and crack near attachment points. In other words, they are relatively brittle and easily split resulting in sharp edges.

Hence, it is desirous to provide an inexpensive hockey stick that displays superior strength and flex. Critically, the shaft must resist impulsive torsional forces resulting from slap shots and power shots that can break conventional composite sticks. Furthermore it is desirous to provide a stick that can be custom configured to provide a custom "feel." Alternatively, it is desirous to provide hockey stick shafts in which the flex varies as desired by a particular player.

SUMMARY OF THE INVENTION

My automated process for producing linearly pultruded hockey stick shaft material is carried out by a machine. The resulting sticks are inexpensive and they display superior strength and flexural ability relative to conventional fiberglass sticks. Arrangements of roving in the present hockey stick can be altered, and resin mixtures can be varied in formulation to provide a broad range of custom configurations.

The machine comprises a frame adapted to rest on a floor or similar surface. An elongated, hollow longitudinal mandrel is substantially coextensive with the length of the frame. Strands of fiber known as "rovings" are disposed upon and pulled along the mandrel, forming alternating longitudinal and radial layers. The rovings are treated with resin and passed through dies while on the mandrel to form a hollow, pultruded product of generally rectangular cross section. The product can be cut up into hockey stick shafts.

A first veil is passed trough a guide and wrapped around the mandrel. Longitudinal rovings are provided from a creel bank mounting several individual spools of rovings. The creel bank comprises a rack of shelves. The spools rest on the shelves, and rovings feed from the center of the spools. The rovings are routed through various guide orifices associated with frame members and the creel rack to direct them to the proper locations and prevent tangling. The rovings are fed around tension bars and wires mounted on the rack to insure proper tension as they are pulled along the mandrel.

A first longitudinal layer of rovings is initially formed about the veil. A roving set is fed through orifices defined in a first pattern card, and then fed through a generally rectangular opening in a gathering bracket to conform to the shape of the veil-wrapped mandrel. A first spiral winding station rotatably mounted to the frame wraps a first radial layer of rovings around the longitudinal rovings. This layer comprises a single ply having four separate strands forming concentric, spaced-apart windings in the form of a helix. The spiral winding station is a disk penetrated by the mandrel. It is turned by an electric motor. The disk mounts several spools of rovings on spindles. The spindles are synchronized by an anti-backlash mechanism.

A second set of longitudinal rovings is applied by a second pattern card and gathered by a second bracket. A second spiral winding station, counter-rotating relative to the first, winds a second radial layer of rovings. The second radial layer also is comprised of separate, spaced apart rovings forming concentric spirals in the form of helixes. Strand segments of the two radial layers define an X-shaped pattern on sides of the pultruded shaft. The two spiral winding stations are driven by the same motor insuring the same rates of rotation.

A third longitudinal layer of rovings is applied by a third pattern card. However this layer is not gathered by a bracket but is fed directly into a resin injector die. Within the injector die, resin is injected into the rovings on the mandrel from the interior outwardly. The resin is injected through a longitudinal bore in the mandrel. The bore is connected to a pressurized resin source at its proximal end. The portion of the mandrel encompassed by the injector die comprises two radial grooves having opposite pitches. Small diameter passages pass from the interior bore of the mandrel to the grooves. Resin passes through these passages to saturate the rovings. The injector die defines an ellipsoidal chamber which acts as a reservoir and a squeegee as the rovings pass through it. The squeegee action of the ellipsoidal chamber insures that resin is pressed into the rovings as it exits the injector die. The bore of the mandrel ends coincident with the distal end of the injector die.

Outer veils are applied to the resin wetted rovings. The newly veiled product is then passed through a heater die for curing. As the product passes out of the heater it passes through a curing die intended to insure that the product maintains its shape as it cures. The curing die has top and bottom longitudinal slots intended to relieve stress on the curing product and provide air circulation. The mandrel has a horizontal longitudinal slot at the distal end. This slot also relieves stress on the curing product and promotes air circulation to facilitate curing of the interior of the product. The mandrel and the curing die terminate concurrently. The bitter end of the product is gripped by a set of modified industrial pullers commonly referred to as mules. These pullers alternate pulling the shaft providing a smooth rate of pultrusion through the machine.

The mandrel is segmented to prevent the pulled rovings from tightening on the mandrel and halting movement. The segments are defined by two abrupt reductions in the size of the mandrel, each immediately following the spiral winding stations.

The resulting hockey stick is comprised of a majority fiber rather than a majority resin as with conventional fiberglass hockey sticks. Preferably the present invention will result in a shaft which is approximately seventy percent fiber and thirty percent resin, by volume. As a result the present hockey stick shaft is stronger and has more desirable flexural properties. The rate of feed trough the machine can be varied to produce hockey stick shafts which vary in flex from the upper portion to the lower portion.

Therefore, a primary object of the present invention is to provide an improved pultrusion process for manufacturing radially reinforced shafts.

Another primary object is to provide a low cost hockey stick which has superior strength and flexural qualities.

It is an object of the present invention to provide a hockey stick which can be custom configured for a particular user.

A related object of the present invention is to provide a hockey stick shaft that comprises is a majority fiber and a minority resin.

A more particular object of the present invention is to provide a hockey stick which is approximately seventy percent by volume fiber and thirty percent resin.

It is an object of the present invention to provide a machine capable of producing a low cost hockey stick which has superior strength and flexural qualities.

It is an object of the present invention to provide a process for mass producing low cost hockey sticks exhibiting superior strength and flexural qualities.

An additional object is to provide a hockey stick shaft in which the flex varies from the upper portion to the lower portion.

Another primary object is to provide a method for the production of linear members by a pultrusion process.

An object of the present invention is to provide a pultruded product which is strong and has desirable flexural qualities.

A related object of the present invention is to provide a process for the production of linear members which results in a product having approximately thirty percent resin by volume and seventy percent fiber.

These and other objects and advantages of the present invention, along with features of novelty appurtenant thereto, will appear or become apparent in the course of the following descriptive sections.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

With attention now directed to the drawings, an automated process for producing liner pultruded products is broadly designated by the reference numeral 30. The product produced by the process 30 is designated by the reference numeral 32. The illustrated product is hockey stick shaft material 32. The machine which carries out the process 30 is broadly designated by the reference numeral 35. Some steps of the process and elements of the machine are repetitive. The processes carried out in the proximal segment 35A of the machine are repeated in the distal segment 35B. These will be described in detail a single time. When an element or step is repeated, any differences between the duplicate and the original will be pointed out.

Figure 1:
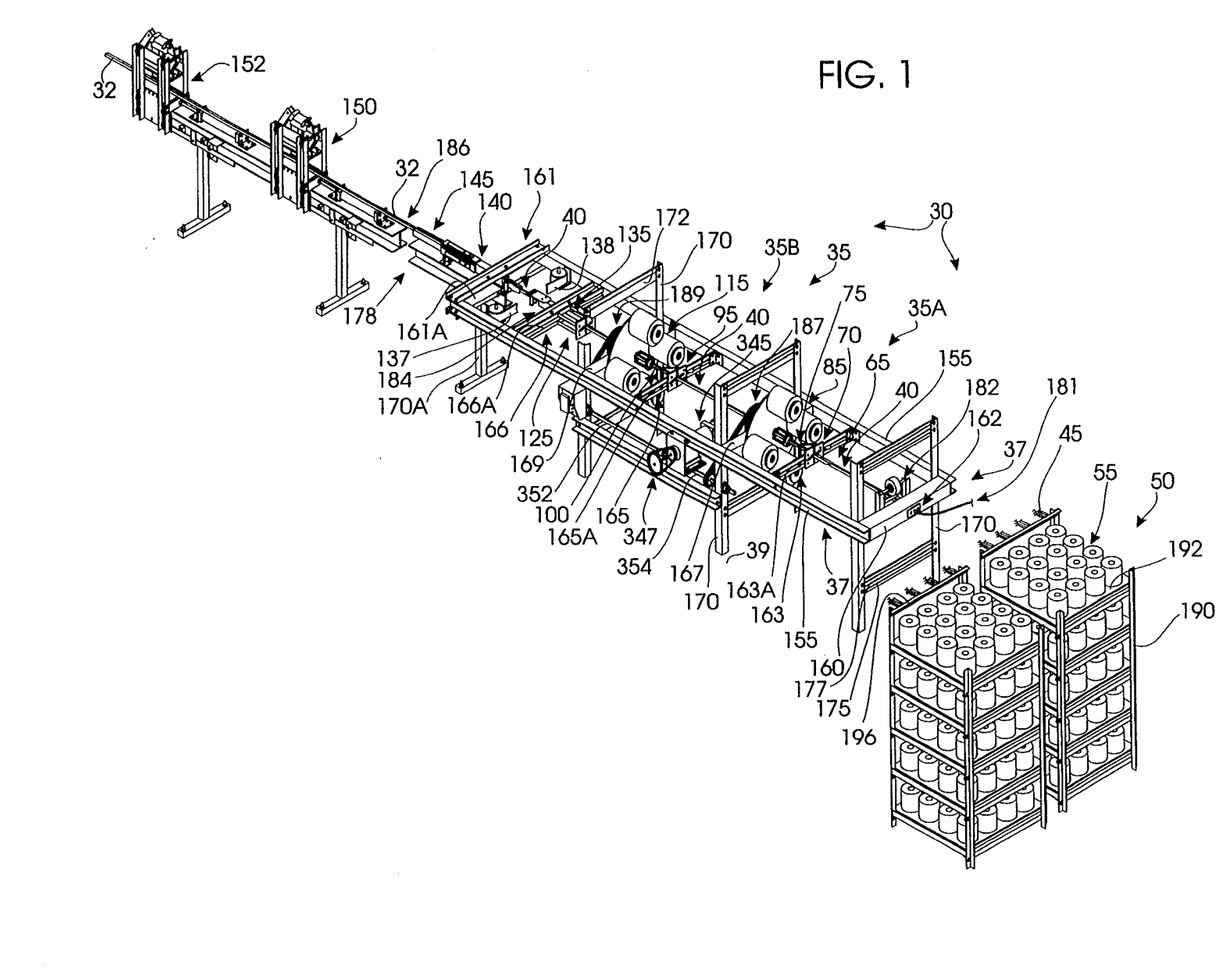
FIG. 1 is a fragmentary, longitudinal isometric view of the overall preferred machine and process, with structural detail omitted for clarity.

The process 30 is carried out on the machine 35 to produce hockey stick shaft material 32. The machine 35 comprises a frame adapted to support the machine 35 on a floor or similar supportive surface 39. A hollow longitudinal mandrel 40 passes through the frame 37. Rovings 45 are longitudinally and radially disposed on the mandrel 40 and treated with resin 47 while passing through dies to form the hockey sticks 32.

Figures 3, 3A:
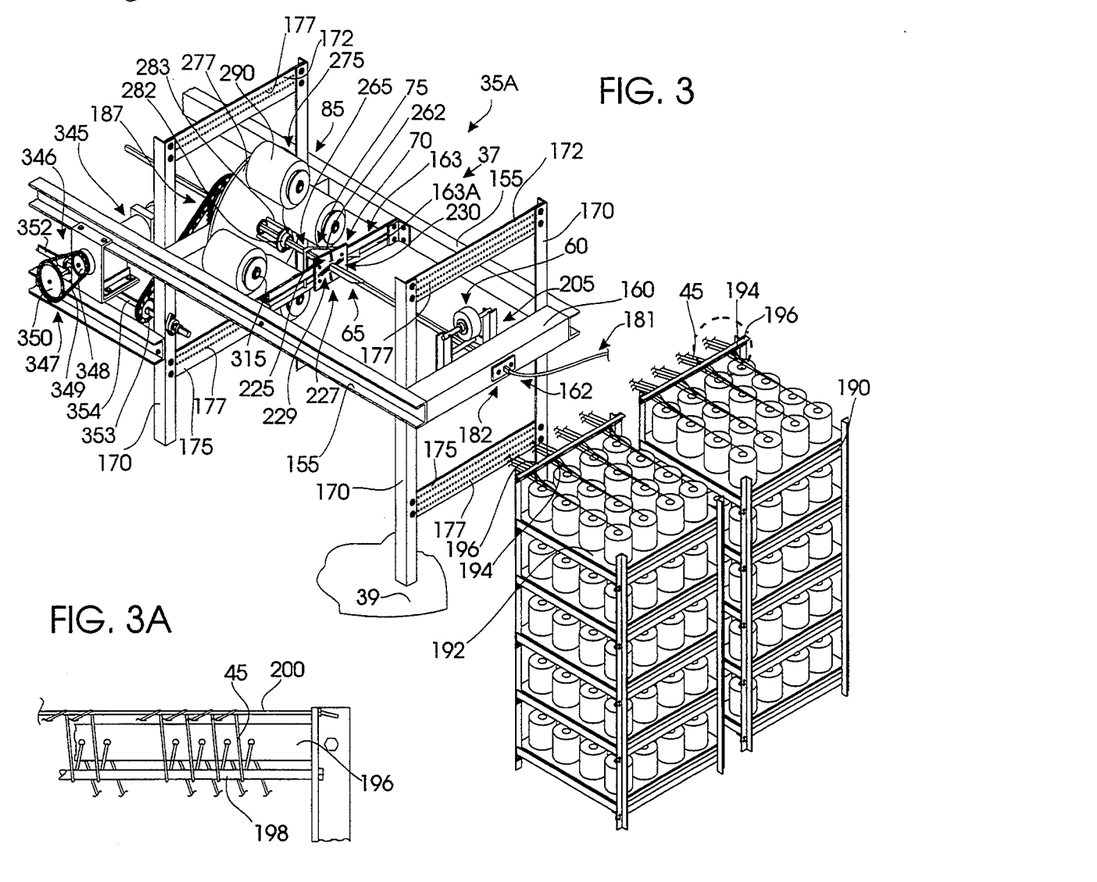
FIG. 3 is an enlarged, isometric, fragmentary view of the first machine segment, showing the creel bank assembly adjacent the proximal end of the machine.
FIG. 3A is an enlarged, fragmentary elevational view taken from the circled area of FIG. 3.

The rovings 45 are provided from a creel bank 50. The creel bank 50 mounts individual spools 55 of thread or rovings 45. The rovings 45 feed from the center of the spools 55 to the proximal segment of the machine 35A. A first veil 60 is wrapped around the mandrel 40 and the rovings 45 disposed about it. The veil 60 is guided to the shape of the mandrel 40 by a guide 65. The rovings 45 are fed through a first pattern card 70 and then feed through a gathering bracket 75 to conform to the shape of the veil wrapped mandrel 40. This forms the first layer of longitudinal rovings 80 for the hockey stick 32. Next the rovings 80 and the veil 60 are wrapped at a spiral winding station 85 which disposes a first radial layer of rovings 90.

As the product 32 moves into the distal segment of the machine 35B, the next step is placement of a second layer of longitudinal rovings 110. The second longitudinal roving set 110 is passed through a second pattern card 95 and gathered by a second bracket 100, forming the second longitudinal layer of rovings 110 on top of the first radial layer 90. A second spiral winding station 115 applies a second radial layer of rovings 120. Each of the radial layers of rovings 90 and 120 comprise helical spaced apart rovings.

Figure 8:
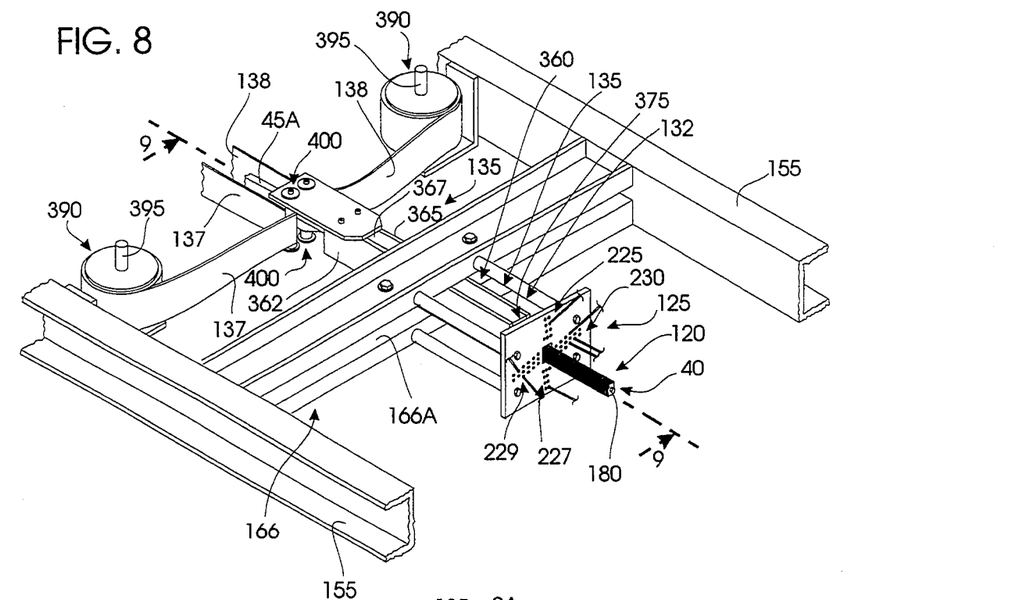
FIG. 8 is an enlarged, fragmentary pictorial view showing the injection die, the third pattern card and application of the outer veil.

The next step in the process 30 is application of a third longitudinal layer of rovings 130. The third roving set 130 is fed through a third pattern card 125 and fed directly into the proximal end 132 of a resin injector die 135. The injector die 135 directs the rovings 130 into contact with the second radial layer of rovings 120.

Figure 9:
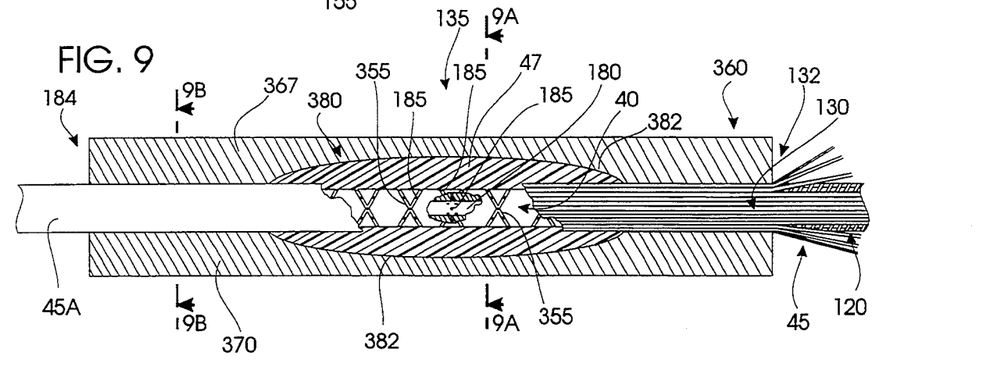
FIG. 9 is an enlarged, fragmentary longitudinal sectional view of the injector die taken generally along line 9—9 of FIG. 8, with portions thereof broken away for clarity, illustrating the internal chamber.

The mandrel 40 injects resin 47 from the interior of the veil 60 and rovings 45 outwardly. The resin 47 is confined by the injector die 135 and is squeegeed from the rovings 45, insuring resin 47 thoroughly saturates all the rovings 45 (FIG. 9). The injector die 135 has an internal shape that will form the desired exterior shape of the product 32. Outer veils 137 and 138 are then applied to the resin wetted rovings 45.

Figure 10:
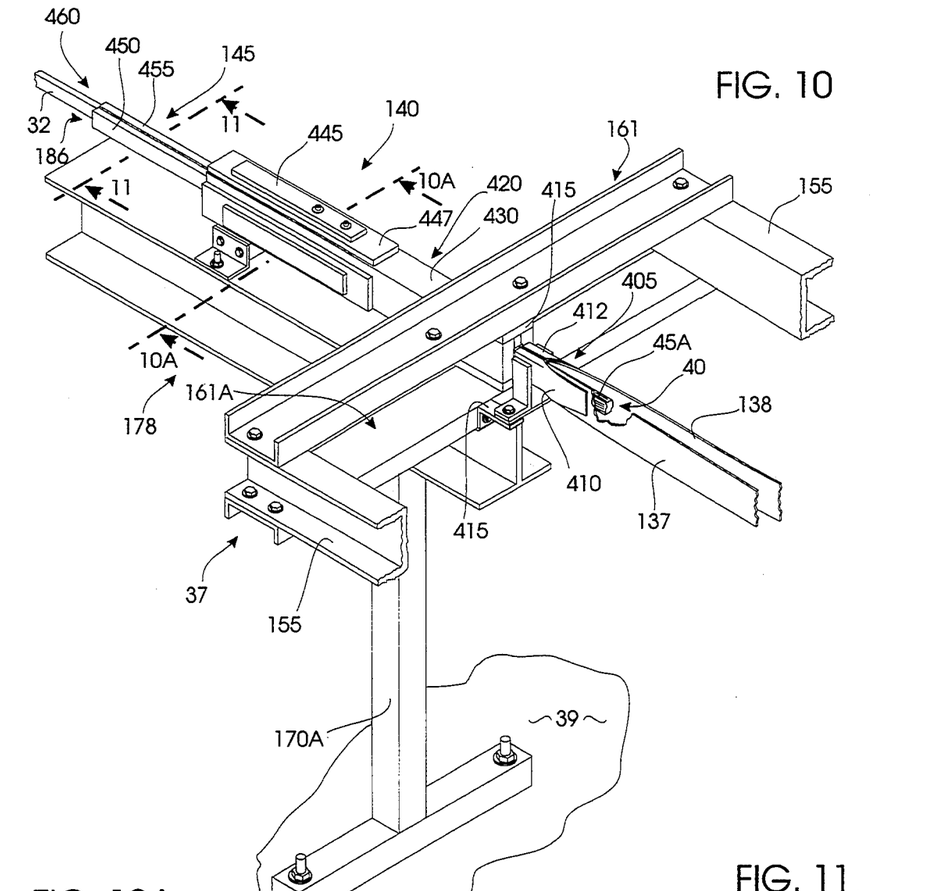
FIG. 10 is an enlarged, fragmentary perspective view of the distal frame portion, showing the preferred heater.
Figure 12:
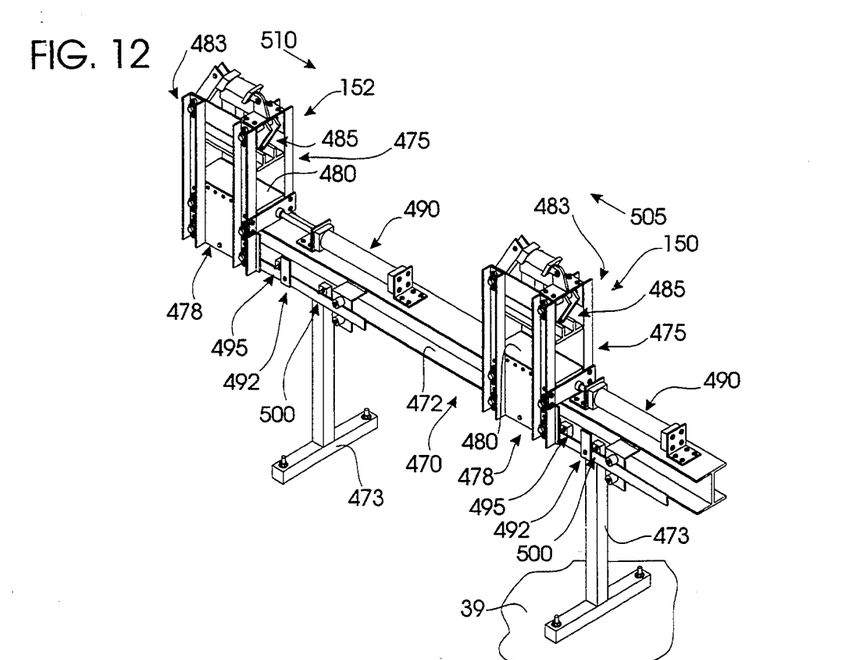
FIG. 12 is an enlarged, fragmentary perspective view of the paired pullers for drawing the pultruded product about the mandrel and through the machine.

The newly veiled product is then passed through a heater 140 for curing. The heater 140 also has an internal shape approximating the desired exterior shape of the product 32. As the product 32 passes out of the heater 140 it passes through a slotted curing die 145. This die 145 insures that the product 32 maintains its shape as it cures coming out of the heater 140. The mandrel 40 and the curing die 145 terminate simultaneously. The bitter end of the shaft 32 is gripped by a pair of pullers 150 and 152. The type of puller illustrated is commonly referred to as a mule. These pullers 150 and 152 alternate pulling the shaft, providing a smooth rate of pultrusion through the machine 35.

With attention now directed to the machine 35 its elements will be described in greater detail. Many elements reoccur throughout the machine 35. These elements will be designated with a single reference numeral and described once. Any differences between the duplicate and the original will be pointed out. The frame 37 is comprised of generally elongated sides 155. The sides 155 are preferably constructed from channel iron. Perpendicular ends 160 and 161 mate with the sides 155. The first frame end defines a flanged orifice 162 for mounting the mandrel 40. Struts 163, 165 and 166 provide mounting positions for the pattern cards 70, 95 and 125 as well as stiffening the frame 37. The struts 163, 165 and 166 are constructed from paired sections of angle or channel iron defining a slot 163A, 165A and 166A therebetween. Cross members 167 and 169 are rigidly welded between the frame sides 155 and mount the winding stations 85 and 115. Legs 170 support the frame 37 on the floor 39. The legs extend upwardly from the frame 37 to mount overhead guidebars 172. Lower guidebars 175 extend between the legs 170 below the level of the frame 37. The guidebars 172, 175 provide orifices 177 to guide the rovings 45 from the creel banks 50 to the pattern cards 70, 95 and 125. A frame extension 178 extends from the second frame end 161. It is primarily a section of I-beam supported by a single leg 170A.

Figure 13:
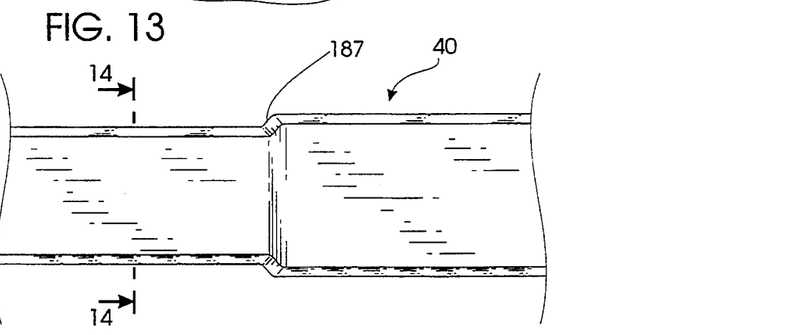
FIG. 13 is an enlarged fragmentary side view of a portion of the preferred mandrel illustrating a reduction in dimension in the mandrel.
Figure 14:
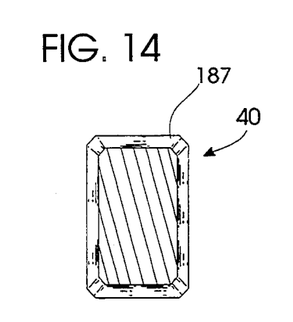
FIG. 14 is an enlarged cross section of the mandrel taken generally along line 14—14 of FIG. 13; and, FIG. 15 is an enlarged, fragmentary side view of a portion of the preferred mandrel illustrating the effects of the reduction in dimension on the rovings being pulled along the mandrel.
Figure 15:
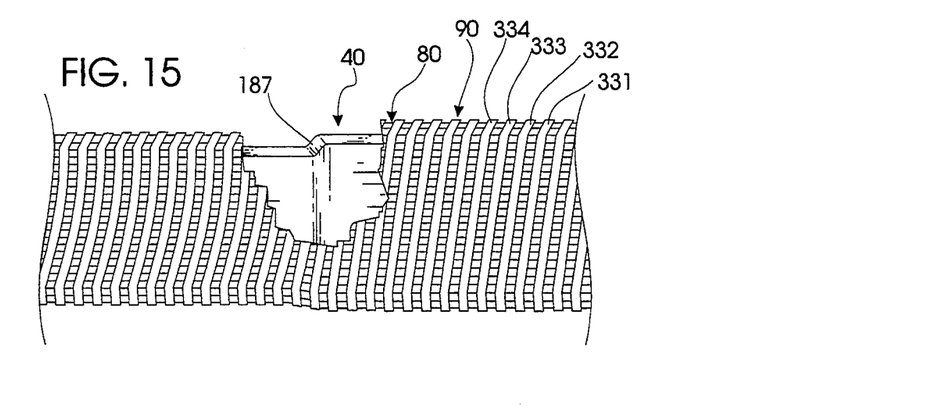

The mandrel 40 is rigidly mounted to the first end 160 and it is suspended through the rest of the machine. The mandrel 40 is generally rectangular in cross section. It has a central longitudinal bore 180. The bore 180 is open at the proximal end 182 of the mandrel 40. It terminates near the distal end 184 of the injector die 135. In the area where the mandrel 40 passes through the injection die 135, small radial passages 185 extend from the bore 180 to the exterior surface of the mandrel 40 (FIG. 9). The resin 47 is injected through the longitudinal bore 180. The bore 180 is connected to a pressurized resin source 181 at its open proximal end 182. The mandrel 40 has abrupt reductions in its exterior dimensions (segmentations) 187 and 189, immediately following each spiral winding station 85 and 115. These reductions in width and height prevent the pulled rovings 45 from tightening on the mandrel 40 resulting in excessive drag (FIGS. 13-15). The distal end 186 of the mandrel 186 is split to ease the interior tension on the pultruded product 32. In other words, the curing product 32 does not necessarily need the support of the entire mandrel 40 so to prevent binding the rigidity of the mandrel 40 is reduced by splitting it down the center. This split 183 also facilitates the circulation of air to the interior of the product 32, promoting curing and cooling.

The rovings 45 are fed from the creel bank 50 through the orifices 177 defined in the overhead and lower guidebars 172 and 175 to the pattern cards 70, 95 and 125. The rovings 45 as mentioned above are fed from the center of spools 55 on the creel bank 50. The creel bank 50 is a rack 190 mounting shelves 192 which holds the spools 55. The rovings 45 feed from the center of the spools 55 through guides 194 disposed in crossbars 196. Tension bars 198 and tension wires 200 also run across the rack 190. The rovings 45 are fed under the tension bars 198 and over the tension wires 200 to insure that they are held taunt during feeding.

The first veil guide 65 directs the inner veil 60 from a spool 205 onto the mandrel 40. The veil guide 65 is comprised of integral longitudinal sides 210 and top 215 which flare from the proximal portion of the mandrel 182 and narrow toward the first pattern card 70. The guide sides 210 and top 215 shape the veil 60 to the contour of the mandrel 40. The bottom of the guide 220 is preferably partially split. The front of the bottom 220 is beveled to further facilitate feeding of the veil 60.

Figure 4:
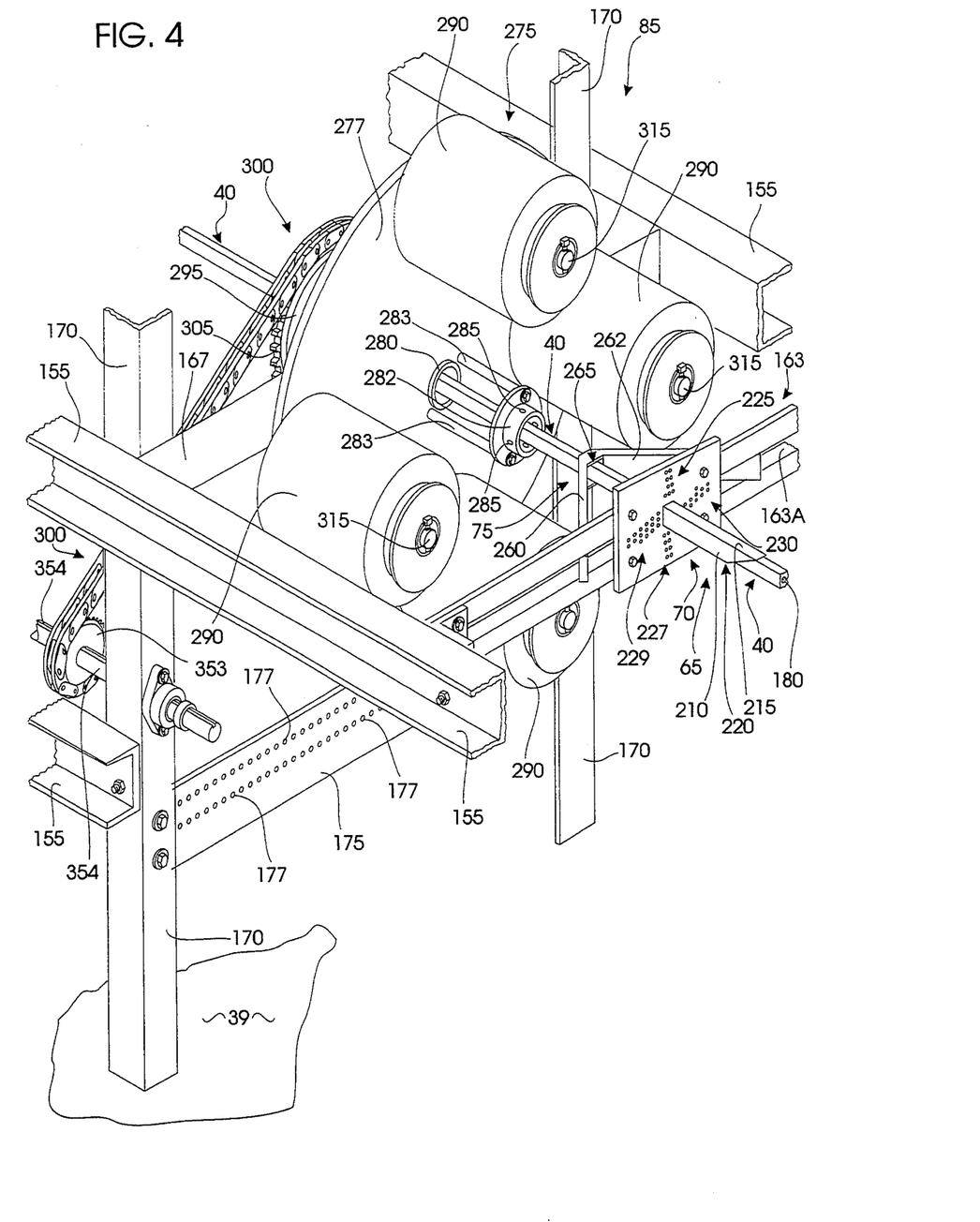
FIG. 4 is an enlarged, fragmentary, isometric view of the first pattern card and accompanying spiral winding station seen in FIG. 3, with the feed strands omitted.

The first pattern card 70 establishes four hole sets to facilitate placement of the first layer of longitudinal rovings 80. This first pattern card 70 is typical of the other two pattern cards 95 and 125. Therefore, this description will suffice for those two cards 95 and 125 as well. As illustrated in FIG. 4 the upper set of holes 225 receive six to seven roving strands 45 for placement directly upon the veil 60 wrapped about the mandrel 40. Similarly, the bottom set 227 of holes receive rovings 45 from the lower guidebar 175 to be disposed along the bottom of the mandrel 40. A set of holes 229 and 230 on either side of the mandrel 40 directs rovings to the sides of the veil wrapped mandrel 40. Half of the side rovings 45 fed through the side holes 229 and 230 are directed from the overhead guidebars 172 the other half come from the lower guidebars 175.

Figure 5:
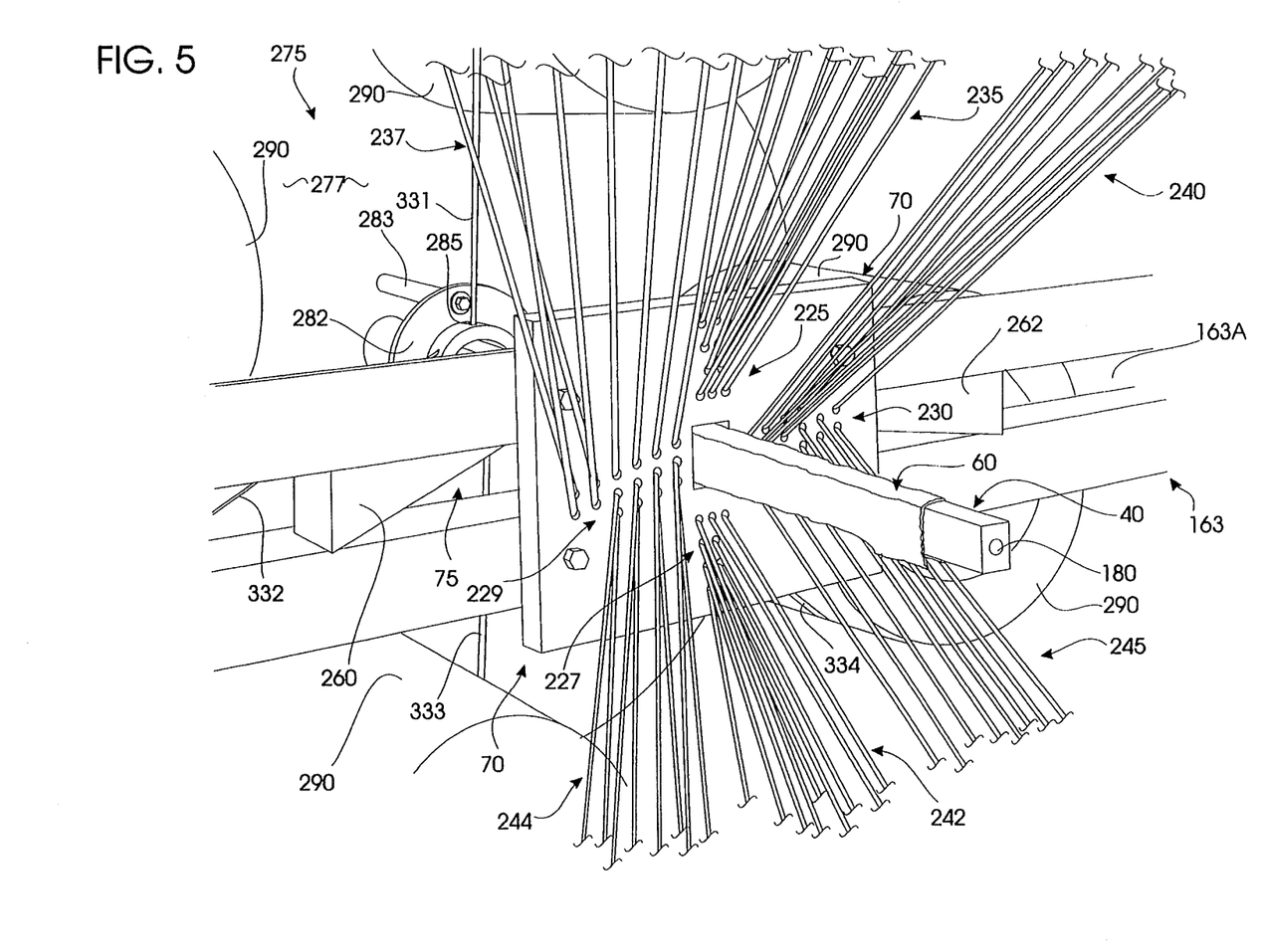
FIG. 5 is an enlarged, fragmentary, perspective view of the pattern card system of FIG. 4.
Figure 6:
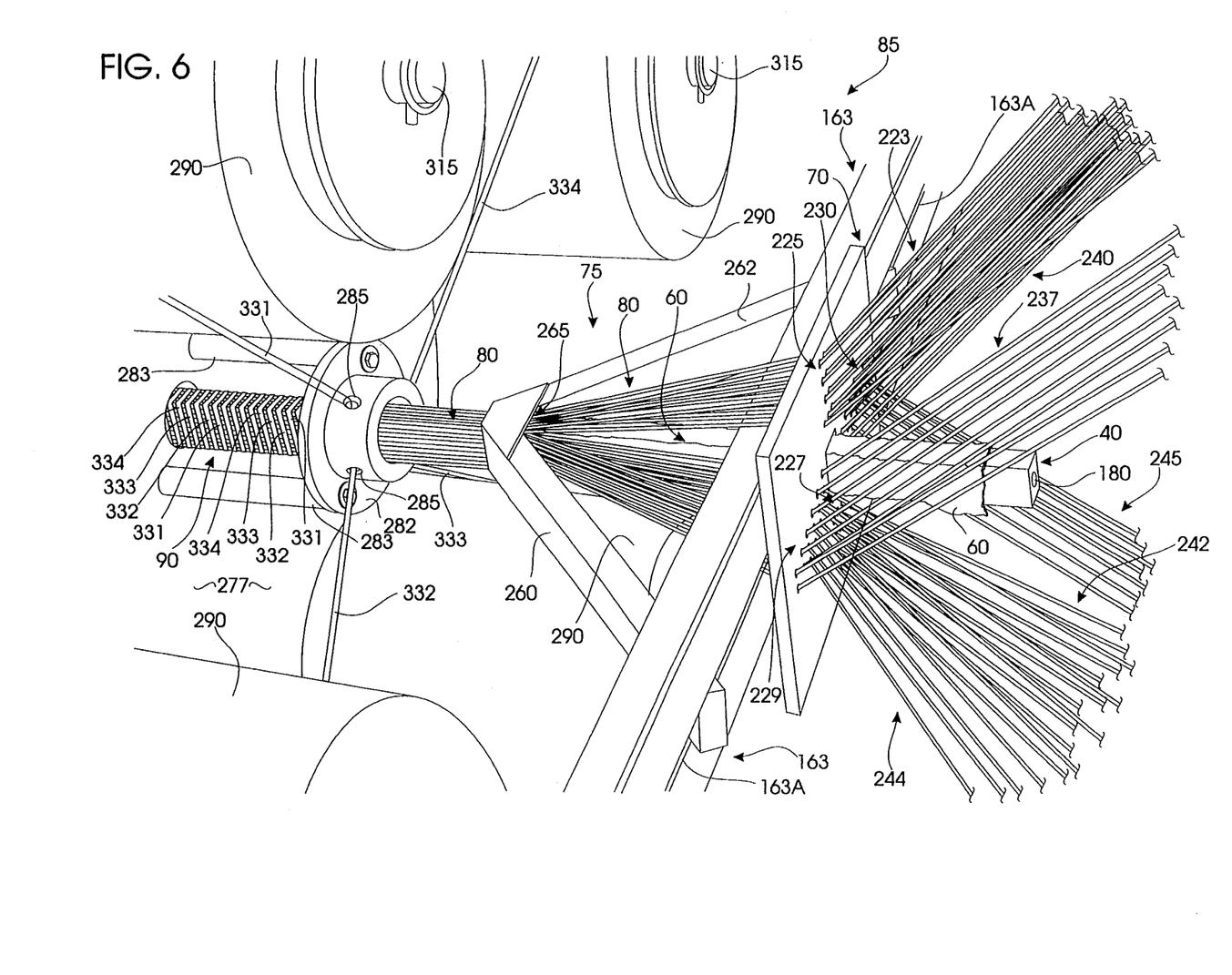
FIG. 6 is a view similar to FIG. 5, but taken generally between the pattern card and the collar of the first spiral winding station.

The rovings 45 feeding through the pattern cards 70, 95 and 125 can be divided into six groups at each card. The rovings 45 which will become the top longitudinal rovings 235 come from the overhead guidebars 172. The other rovings coming from the overhead guidebars 172 are shunted to either side to form the upper side rovings 237 and 240 of the longitudinal rovings 80, 110 and 130. The rovings 45 fed from the lower guidebars 175 are similarly divided into the bottom longitudinal rovings 242 and lower side rovings 244 and 245.

Tension is maintained in the rovings 45 by the tension bars 198 and wires 200 associated with the creel rack 190. Additional tension is present due to the rovings 45 passing through the orifices 194 associated with the cross bars 196 on the creel rack 190, orifices 177 on guidebars 172 and 175 and orifices 225, 227, 229 and 230 on pattern cards 70, 95 and 125. Tension is necessary to hold the rovings 45 against the mandrel 40 until the resin 47 is applied.

A first gathering bracket 75 is defined between the first pattern card 70 and the first spiral winding station 85. A similar, second bracket 100 is defined between the second pattern card 95 and second winding station 115. However, a gathering bracket is not associated with the third pattern card 125. The proximal end 132 of the injector die 135 acts to gather the rovings 45 from the third pattern card 125. The gathering brackets 70 and 100 are generally triangular. They comprise a pair of spaced apart arms 260 and 262 extending from the first strut 163. The arms 260 and 262 converge forming a generally rectangular opening 265. The interior dimensions of the opening 265 approximate the desired exterior dimensions of the product 32. As the rovings 45 are fed through the opening 265 they are directed against the mandrel 40 forming the first two longitudinal layers 80 or 110. The spiral winding stations 85 and 115 wrap radial layers of rovings 90 and 120 over the first two layers of longitudinal rovings 80 and 110. The radial layers 90 and 120 help maintain the first two longitudinal layers 80 and 110 in place.

The first spiral winding station 85 is similar to the second 115. The primary difference between the two stations 85 and 115 is that they rotate in opposite directions. The spiral winding stations 85 and 115 are each comprised of a rotatable disk 275 coaxially penetrated by the mandrel 40. The rotatable disk 275 comprises a generally circular plate 277 mounted on a hollow shaft 280. A generally cylindrical collar 282 is centrally mounted to the plate 277, employing spacers 283. The collar 282 and shaft 280 are coaxially penetrated by the mandrel 40. The collar comprises radially spaced apart feed orifices 285 which receive rovings 45 fed from four radially spaced apart spools 290 rotatably mounted to the disk plate 277. As the disk 275 is rotated the rovings 45 are fed from the exterior of the spools 290 onto the longitudinal rovings 80 or 110 disposed on the mandrel 40. Each frame crossmember 167 and 169 extending between the frame sides 155 comprises a hub 295 which receives the disk shaft 280. The disk shaft 280 is rotated by a chain and sprocket assembly 300. The driven sprocket 305 is secured to the shaft 280.

Figure 7:
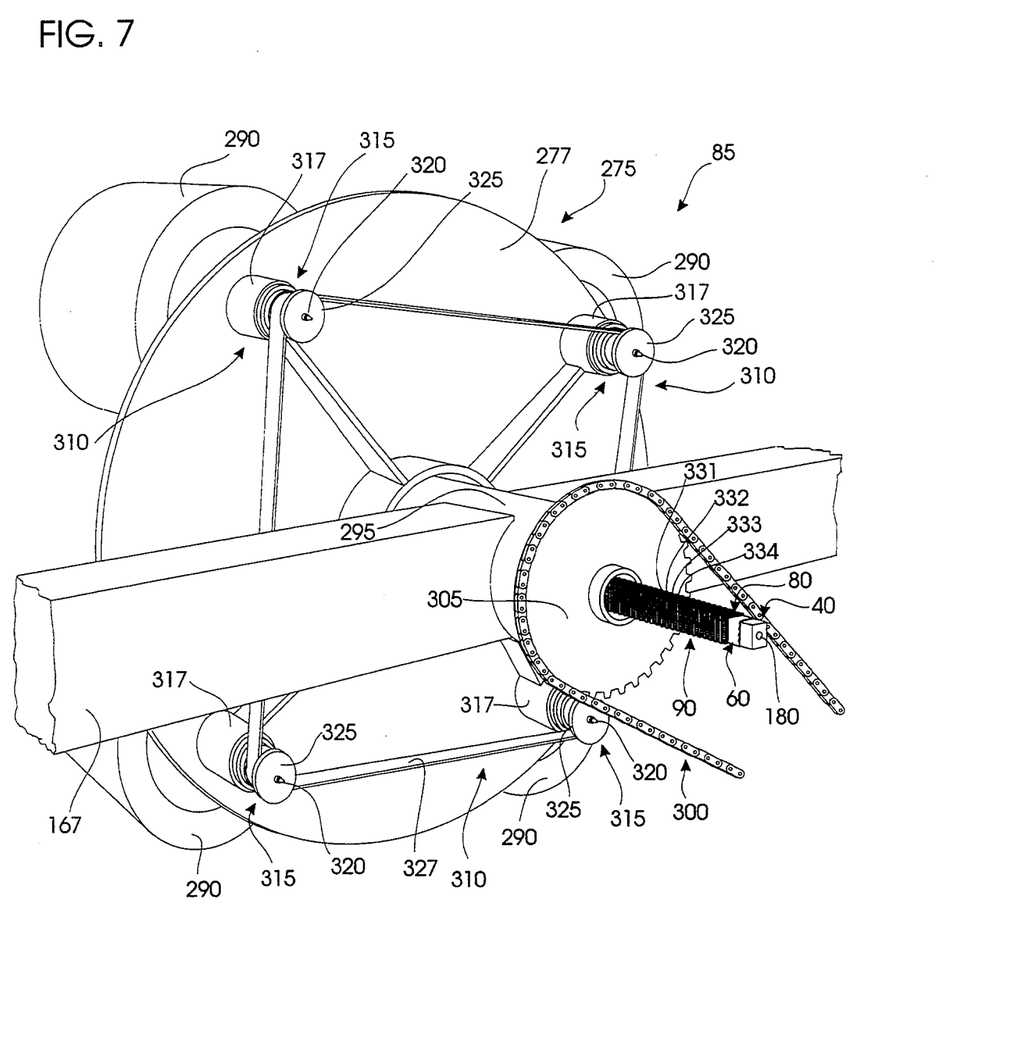
FIG. 7 is an enlarged, fragmentary perspective view showing the distal side of a spiral winding station, with the tension backlash assembly illustrated therein.

An anti-backlash system 310 for the disk spools 290 is disposed on the opposite side of the plate 277 (FIG. 7). Rotatable spindles 315 for mounting the spools 290 extend through the disk plate 277. The spindles 315 are mounted in journals 317 secured to the plate 277. The spindles 315 are hollow and have grease fittings 320 to allow internal greasing of the spindle 315 and journal 317. Pulleys 325 are mounted on the spindles 315, opposite the spools 290. The pulleys 325 are interconnected by a V-belt 327 to insure synchronization and preservation of tension. Tension provides drag on the rovings 45 windings from the spools onto the mandrel 40. Synchronization and tension prevents over-rotation thereby preventing slack in the rovings 45 and reducing the danger of tangling.

Figure 2:
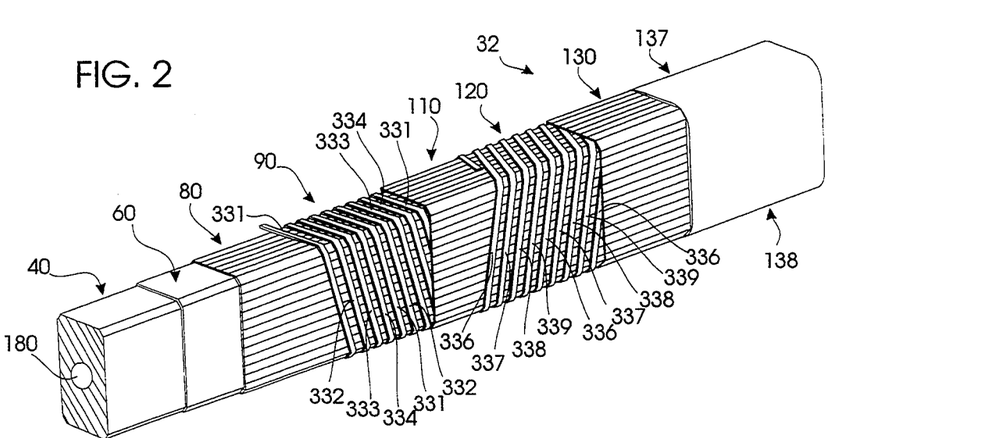
FIG. 2 is an enlarged, fragmentary view of a preferred hockey stick shaft formed through the disclosed pultrusion process, with the mandrel shown for purposes of illustration, and with layers of the process progressively broken away.

Each radial layer of rovings 90 or 120 comprises four separate concentric roving helixes wound about the underlying longitudinal layer of rovings 80 or 110. The first layer of radial rovings 90 is comprised of roving helixes 331, 332, 333 and 334. The second layer of radial rovings 120 is comprised of roving helixes 336, 337, 338 and 339. The counter rotation of the winding stations 85 and 115 produce a crossed or "X" pattern between the roving helixes 331–334 and 336–339. The counter rotation of the second winding station 115 and resulting "X" pattern is achieved by interconnecting the two spiral winding stations 80 and 115 and driving them with the same motor 345.

Preferably an electric motor 345 drives the spiral winding stations 80 and 115. It drives a right-angle gear assembly 346 via a primary chain drive 347. Chain drive assemblies 300 and 347 are used to reduce the high speed of the motor 345 to the slower speed required by the spiral winding of stations 80 and 115. The primary chain drive 347 comprises an output sprocket 348 mounted on the output shaft of the motor 345; a chain 349; and an input sprocket 350 mounted on the input shaft of the right-angle gear assembly 346. The right-angle gear assembly 346 has an output driveshaft 352 or 354 on either side. The driveshafts 352 and 354 rotate in opposite directions. The spiral winding station chain and sprocket assemblies 300 are driven by the driveshafts 352 and 354. The drive sprockets 353 of the station assemblies 300 are mounted on the driveshafts 352 and 354. As a result, the spiral winding stations 80 and 115 are driven at the same speed by the motor 345 but in opposite directions.

As mentioned above the third pattern card 125 feeds directly into the proximal end 132 of the resin injector die 135. The mandrel 40 extends through the resin injector die 135. The radial passages 185 in the mandrel 40 begin just within the injector die 135. These passages 185 conduct resin 47 from inside the mandrel 40 into the rovings 45 disposed about the mandrel 40. The radial passages 185 open onto shallow, radial grooves 355 cut into the exterior of the mandrel 40. The grooves 355 facilitate passage of resin 47 from the passages 185. The resin injector die 135 insures that the resin 47 is confined within the rovings 45, fully saturating them.

Figure 9A:
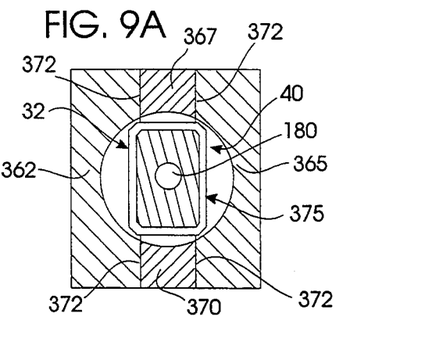
FIG. 9A is an enlarged, fragmentary cross section of the injector die taken generally along line 9A—9A of FIG. 9 illustrating the die portion of the injector die.
Figure 9B:
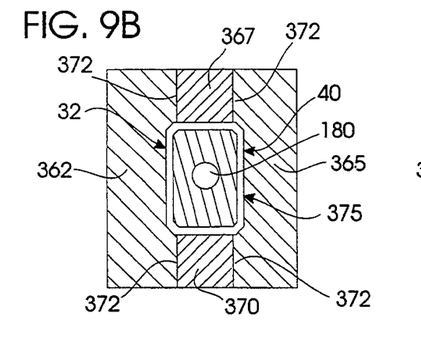
FIG. 9B is an enlarged, fragmentary cross section of the injector die taken generally along line 9B—9B of FIG. 9 illustrating the internal chamber.

The injector die 135 is comprised of a generally parallelepiped housing 360. The housing 360 is comprised of generally parallel spaced apart sides 362 and 365, a perpendicular top 367 and bottom 370. The die 135 is constructed of individual pieces which may be disassembled to facilitate cleaning. The sides 362 and 365 are generally "C" shaped. The legs 372 of the sides 362 and 365 are beveled to provide the exterior of the product with beveled corners. The top 367 and bottom 370 act as spacers joining the opposite legs 372 of the "C" shaped sides 362 and 365. Aligned bolting orifices extend through the sides 362 and 365, top 367 and bottom 370 to receive allen bolts and nuts. The central passage 375 defined by the injector die 135 has a central reservoir cavity 380. The reservoir cavity 380 is a slightly enlarged portion of the passage 375 having a curved outer wall 382. The reservoir 380 allows the resin 47 to collect so it will fully saturate the rovings 45 as they feed through. However, the ellipsoidal shape of the reservoir cavity 380 (FIG. 9) also acts as a squeegee to insure that excess resin 47 is removed as the rovings 45 pass out of the reservoir cavity 380. This squeegee action insures that the resin 47 saturates the rovings 45 by forcing the resin 47 into the rovings 45.

Outer veils 137 and 138 are applied to the resin impregnated rovings 45A as they come out of the injector 135. Spools 390 holding the outer veils 137 and 138 are disposed on spindles 395 affixed to the interior of each frame side 155. The veils 137 and 138 pass from the spools 390 across idlers 400 into a folder 405. The folder is comprised of two generally "C" shaped flanged sides 410 and 412 which contour the veil to the shape of the resin impregnated rovings 45 on the mandrel 40. All the components of the finished product 32 are now disposed on the mandrel 40.

Figure 10A:
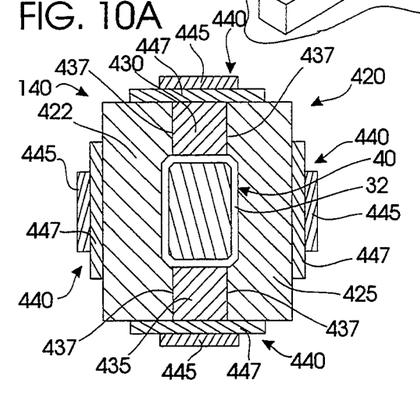
FIG. 10A is an enlarged, fragmentary cross section of the heater taken generally along line 10A—10A of FIG. 10.

Next, the veiled rovings 45 are fed into the heater 140. The heater 140 is mounted by flanges 415 extending from a slot 161A defined by the second end 161 of the frame 37. The heater 140 also acts as a die to shape the exterior of the product 32. The heater 140 is comprised of a housing 420 having a similar to the injector 135. It has generally "C" shaped sides 422 and 425 bolted to a relatively narrow top 430 and bottom 435. The legs 437 of the sides are beveled similar to the injector die 135. Heating elements 440 are disposed on the exterior of the heater housing 420. The elements 440 are comprised of electrical resistive heating strips 445 disposed on diffusers 447 which are fixed directly to the housing 420. The diffusers 447 are made of a refractory material intended to spread heat evenly to the housing 420. As the curing product 32 passes out of the heater 140 it is passed through a curing die 145.

Figure 11:
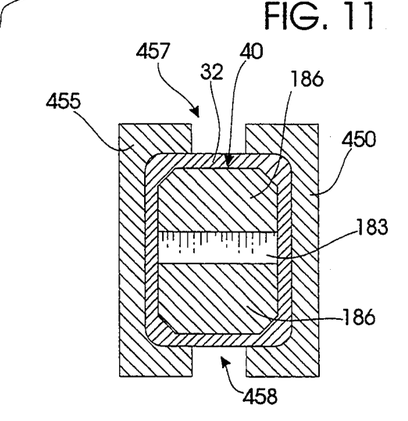
FIG. 11 is an enlarged fragmentary sectional view taken generally along the line 11—11 of FIG. 10.

The curing die 145 is comprised of two, opposed "C" shaped sides 450 and 455, facing one another, defining upper and lower slots 457 and 458 therebetween. The curing die 145 facilitates retention of the desired shape of the product 32 during curing. Curing should be complete by the time the material passes out of the curing die 145. The split 183 in the distal end of the mandrel 186 begins concurrent with the curing die 145. The mandrel 40 also terminates concurrent with the distal end 460 of the curing die 145. As pointed out above the split 183 relives tension on the finished product and allows circulation of air to the product 32 to promoting curing and cooling. The slots 457 and 460 in the curing die 145 accomplish a similar task.

The product feeds from the mandrel into pullers 150 and 152 (FIG. 12). The pullers 150 and 152 alternately grasp the finished product and pull it longitudinally. This draws the rovings 45 through the machine 35. The pullers 150 and 152 are conventional linear industrial pulling devices. Preferably, two pullers 150 and 152 are used to provide a constant speed and smoothness of pull. The use of this type of devices is important, so that tension is maintained on the rovings 45 and therefore the product 32 is of as high a quality as possible.

The pullers 150 and 152 are mounted on a frame 470. The puller frame 470 is generally aligned with the frame extension 178. The puller frame 470 is primarily an I-beam rail 472 supported by a pair of legs 473. The pullers 150 and 152 are slidably coupled to the rail 472. Each puller 150 and 152 comprises a generally rectangular framework 475. The lower portion 478 of the framework slidably captivates the rail 472. A horizontal sill 480 extends across the framework 475, above the rail 472. The upper portion 483 of the framework mounts a pneumatically operated press 485.

In operation the product 32 is grasped between the press 485 and the sill 480. The framework 475 is slid forwardly by a hydraulic cylinder 490 extending between the framework 475 and the rail 472. An arm 492 extending from the framework 475 contacts a first switch 495. The first switch 495 signals the press 485 to open and the cylinder 490 to retract. The retracting cylinder 490 slides the framework 475 back along the rail 472. A second switch 500 is contacted by the arm 492 when the framework 475 is slid back sufficiently. This signal closes the press 485, and the process is repeated. One puller 150 or 152 is closed at all times and is sliding forward as indicated by arrow 505. The other 152 or 150 is open and sliding back, as indicated by arrow 510. Thus, a constant rate of smooth pulling is provided.

From the foregoing, it will be seen that this invention is one well adapted to obtain all the ends and objects herein set forth, together with other advantages which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

What is claimed is:

1. A hockey stick shaft comprising:
   a longitudinal central cavity defining an interior of said shaft;
   an open proximal end adapted to receive a plug;
   an open distal end adapted to mate with a blade;
   a first longitudinal layer of rovings; a first radially wound layer of rovings spiraled about said first longitudinal layer and comprising individual, spaced apart, concentric roving helixes;
   a second longitudinal layer of rovings formed on said first radially wound layer;
   a second radially wound layer of rovings spiraled about said second longitudinal layer and comprising individual, spaced apart, concentric roving helixes;
   a third longitudinal layer of rovings disposed on said second radially wound layer; and,
   an outer veil enveloping said third longitudinal layer.

2. A shaft as defined in claim 1 wherein said first and second radially wound layers are oppositely pitched.

3. A shaft as defined in claim 1 wherein said rovings form a matrix, said matrix comprising approximately seventy percent by volume of said shaft.

4. A shaft as defined in claim 3 wherein said cavity is generally rectangular in cross section and said matrix comprises an interior and exterior generally rectangular in cross section.

5. A linear product produced by an automated pultrusion method, said method comprising the steps of:
   providing a plurality of roving sources from a creel bank comprising a plurality of spools;
   forming and drawing the product through the process about and upon an elongated, rigid mandrel;
   guiding an inner veil upon said mandrel;
   feeding a first set of rovings through a first pattern card for converging said first set of rovings toward said mandrel;
   gathering said first set of rovings into abutment with said mandrel and said inner veil to establish a first longitudinal layer of rovings;
   spirally winding rovings radially about said first longitudinal layer of rovings and said mandrel in a first radial direction relative to said mandrel, thereby establishing a first radial layer of separate roving helixes;
   feeding a second set of rovings through a second pattern card for converging said second set of rovings toward said mandrel;
   gathering said second set of rovings into abutment with said first radial layer of rovings and said mandrel to establish a second longitudinal layer of rovings;
   spirally winding rovings radially about said second longitudinal layer of rovings and said mandrel in a second, opposite radial direction relative to said mandrel, thereby establishing a radial layer of separate roving helixes;
   feeding a third set of rovings through a third pattern card for converging said third set of rovings toward said mandrel;
   gathering said third set of rovings into abutment with said second radial layer of rovings and said mandrel to establish a third longitudinal layer of rovings;
   saturating said inner veil and roving layers in resin;
   guiding an outer veil upon said third longitudinal layer of rovings; and,
   heating said product to cure said resin.

6. A linear product produced by an automated pultrusion method, said method comprising the steps of:
   providing a plurality of roving sources from a creel bank comprising a plurality of spools;

forming and drawing the product through the process about and upon an elongated, rigid mandrel;

guiding an inner veil upon said mandrel;

continuously feeding a first set of rovings through a first pattern card for converging said first set of rovings toward said mandrel;

gathering said first set of rovings into abutment with said mandrel and said inner veil to establish a first longitudinal layer of rovings;

spirally winding rovings radially about said first longitudinal layer of rovings and said mandrel in a first radial direction relative to said mandrel, thereby establishing a first radial layer of separate roving helixes;

continuously feeding a second set of rovings through a second pattern card for converging said second set of rovings toward said mandrel;

gathering said second set of rovings into abutment with said first radial layer of rovings and said mandrel to establish a second longitudinal layer of rovings;

spirally winding rovings radially about said second longitudinal layer of rovings and said mandrel in a second, opposite radial direction relative to said mandrel, thereby establishing a radial layer of separate roving helixes;

feeding a third set of rovings through a third pattern card for converging said third set of rovings toward said mandrel;

gathering said third set of rovings into abutment with said second radial layer of rovings and said mandrel to establish a third longitudinal layer of rovings;

wherein all of said winding steps are synchronized and the speed of said drawing step is synchronized with the radial speed of said winding steps;

saturating said inner veil and roving layers in resin by injecting resin thereon;

guiding an outer veil upon said third longitudinal layer of rovings; and, heating said product to cure said resin.

* * * * *